(12) United States Patent
Koo (10) Patent No.: US 7,713,457 B2
(45) Date of Patent: May 11, 2010

(54) COMPOSITE SHEET MATERIALS AND PROCESSES FOR MANUFACTURING SAME

(75) Inventor: John C. S. Koo, Los Angeles, CA (US)

(73) Assignee: Dynasty Footwear, Ltd., El Segundo, CA (US)

( * ) Notice: Subject to any disclaimer, the term of this patent is extended or adjusted under 35 U.S.C. 154(b) by 74 days.

(21) Appl. No.: 12/050,887

(22) Filed: Mar. 18, 2008

(65) Prior Publication Data

US 2008/0230942 A1    Sep. 25, 2008

Related U.S. Application Data

(60) Provisional application No. 60/896,315, filed on Mar. 22, 2007.

(51) Int. Cl.
| | |
|---|---|
| B32B 33/00 | (2006.01) |
| B32B 1/00 | (2006.01) |
| B32B 37/00 | (2006.01) |
| B29C 47/00 | (2006.01) |
| B29C 53/00 | (2006.01) |
| B29C 39/14 | (2006.01) |
| B29C 41/24 | (2006.01) |
| B29C 43/22 | (2006.01) |
| B29C 45/14 | (2006.01) |
| B29C 33/58 | (2006.01) |
| B29C 44/12 | (2006.01) |
| B29C 67/00 | (2006.01) |
| B28B 11/18 | (2006.01) |
| B28B 7/30 | (2006.01) |
| B29D 7/00 | (2006.01) |
| B29D 35/00 | (2010.01) |
| B27N 3/10 | (2006.01) |
| B29B 13/00 | (2006.01) |

(52) U.S. Cl. .................. 264/171.11; 264/171.13; 264/148; 264/151; 264/166; 264/172.19; 264/212; 264/244; 264/257; 264/259; 264/266; 264/271.1; 264/261; 264/313; 264/316; 264/45.3; 264/45.8; 264/45.9; 264/46.4

(58) Field of Classification Search ............ 264/148, 264/151, 166, 167, 171.11, 171.13, 172.19, 264/212, 244, 257, 259, 266, 271.1, 261, 264/313, 316, 45.3, 45.8, 45.9, 46.4
See application file for complete search history.

(56) References Cited

U.S. PATENT DOCUMENTS

| | | | | |
|---|---|---|---|---|
| 1,613,521 | A | * | 1/1927 | Martin ................ 12/41.5 |
| 1,969,706 | A | * | 8/1934 | Heintz ................ 101/122 |
| 3,251,727 | A | | 5/1966 | Reynolds et al. |

(Continued)

OTHER PUBLICATIONS

Written Opinion and International Search Report in corresponding PCT application PCT/US2008/057385.

*Primary Examiner*—Khanh Nguyen
*Assistant Examiner*—Matthew Hoover
(74) *Attorney, Agent, or Firm*—Joseph G. Swan, P.C.

(57) ABSTRACT

Provided are, among other things, systems, methods and techniques for manufacturing sheet material. In one representative embodiment, a sheet of fabric material is positioned across a patterning template that has a number of openings; and the sheet of fabric material and the patterning template are fed through an extrusion device in which extrusion material coats the fabric material and forces the fabric material into the openings in the patterning template, thereby producing a composite sheet material.

12 Claims, 7 Drawing Sheets

U.S. PATENT DOCUMENTS

| | | |
|---|---|---|
| 3,736,202 A | 5/1973 | Sorenson |
| 3,772,117 A * | 11/1973 | Vossen ..................... 156/140 |
| 3,985,929 A * | 10/1976 | von Bonin et al. .......... 442/103 |
| 4,426,344 A | 1/1984 | Dinter et al. |
| 4,743,488 A | 5/1988 | Jones et al. |
| 4,925,724 A * | 5/1990 | Ogden ....................... 428/137 |
| 5,325,647 A | 7/1994 | Forry et al. |
| 5,392,698 A * | 2/1995 | Sprecher et al. ........... 99/443 C |
| 5,585,161 A | 12/1996 | Difloe et al. |
| 6,046,413 A | 4/2000 | Simonis et al. |
| 6,294,036 B1 | 9/2001 | Loubinoux et al. |
| 2004/0157042 A1* | 8/2004 | Ackerman et al. .......... 428/141 |

\* cited by examiner

COMPOSITE SHEET MATERIALS AND PROCESSES FOR MANUFACTURING SAME

This application claims the benefit of U.S. Provisional Patent Application Ser. No. 60/896,315, filed on Mar. 22, 2007, and titled "Composite Sheet Material", which application is incorporated by reference herein as though set forth herein in full.

FIELD OF THE INVENTION

The present invention pertains to composite sheet materials, such as sheet materials made of both natural and synthetic materials (e.g., a natural fabric and a synthetic polymer) and/or sheet materials made from both new and recycled materials (e.g., natural or synthetic rubber), as well as to processes for manufacturing such sheet materials.

BACKGROUND

A variety of different kinds of materials exist. However, there is a constant need for new and better materials, particularly for materials that have specific advantages in specific contexts, as well as for improved processes for manufacturing such materials.

For instance, different kinds of materials have been used in the construction of shoe soles. However, many of such materials have shortcomings, such as high manufacturing costs, high costs for raw materials and/or poor suitability for particular environments. In addition to these considerations, when manufacturing shoes abroad it is often desirable to minimize import duties or reduce costs resulting from use of carbon credits, which sometimes can be accomplished by appropriately constructing a shoe's sole. For instance, in many cases if at least 50% of the ground-contacting portion of the bottom surface of a shoe is a natural material, the shoe can qualify for a significantly lower United States import duty. See, e.g., chapter 64 of the Harmonized Tariff Schedule of The United States.

SUMMARY OF THE INVENTION

The present invention addresses the foregoing needs by providing, among other things, extrusion-based techniques for manufacturing composite sheet material.

More specifically, one embodiment of the invention is directed to manufacturing sheet material in which a sheet of fabric material is positioned across a patterning template that has a number of openings; and the sheet of fabric material and the patterning template are fed through an extrusion device in which extrusion material coats the fabric material and forces the fabric material into the openings in the patterning template, thereby producing a composite sheet material.

Another embodiment of the invention is directed to manufacturing sheet material in which a patterning template, having a number of openings, is fed through an extrusion device in which extrusion material is forced into the openings in the patterning template, thereby producing a composite sheet material that includes a surface having alternating areas of the extrusion material and the patterning template. In this embodiment, the extrusion material and the patterning template are made of different materials, and: (1) the patterning template is formed from a natural material, (2) the patterning template is made from a recycled material, and/or (3) the extrusion material is made from a recycled material.

A still further embodiment of the invention is directed to manufacturing sheet material in which a patterning template having a plurality of openings is fed through an extrusion device, in which extrusion material is forced into the openings in the patterning template; the patterning template is removed after the extrusion material has at least partially cured; and a replacement piece is bonded into indentations in the extrusion material produced by the patterning template, thereby producing a composite sheet material. According to this embodiment, the extrusion material and the replacement piece are made of different materials, and: (1) the replacement piece is formed from a natural material, (2) the replacement piece is made from a recycled material, and/or (3) the replacement piece is made from a recycled material.

The foregoing summary is intended merely to provide a brief description of certain aspects of the invention. A more complete understanding of the invention can be obtained by referring to the claims and the following detailed description of the preferred embodiments in connection with the accompanying figures.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

DESCRIPTION OF THE PREFERRED EMBODIMENT(S)

Figure 1:
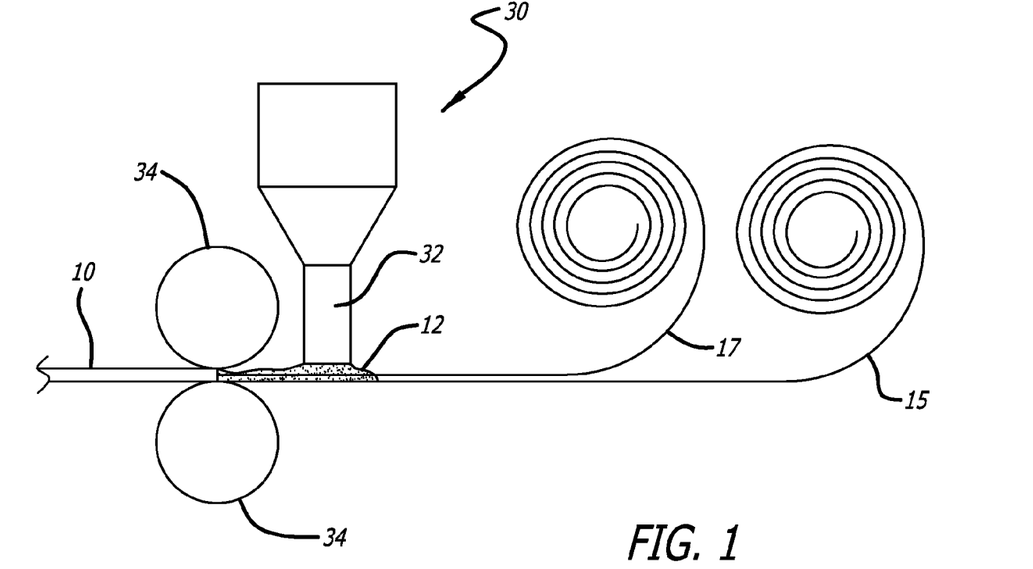
FIG. 1 is a conceptual side view of an extrusion system for manufacturing a composite sheet material according to a representative embodiment of the present invention.

In one representative embodiment of the present invention, e.g., as illustrated in FIG. 1, a composite sheet material 10 is manufactured by extruding a base material 12 (initially in liquid or semi-liquid form or in the form of a pliable soft material) onto a patterning insert 15 covered by a sheet of patterning material 17. In the embodiment shown in FIG. 1, the patterning template 15 is dispensed from a roll and typically is intended to be permanently embedded within the composite sheet material 10. In alternate embodiments, discussed in more detail below, the patterning template is removed from the resulting sheet material and then, if desired, one or more other pieces may be bonded into the indentations formed by the removed patterning template.

Figures 4, 5:
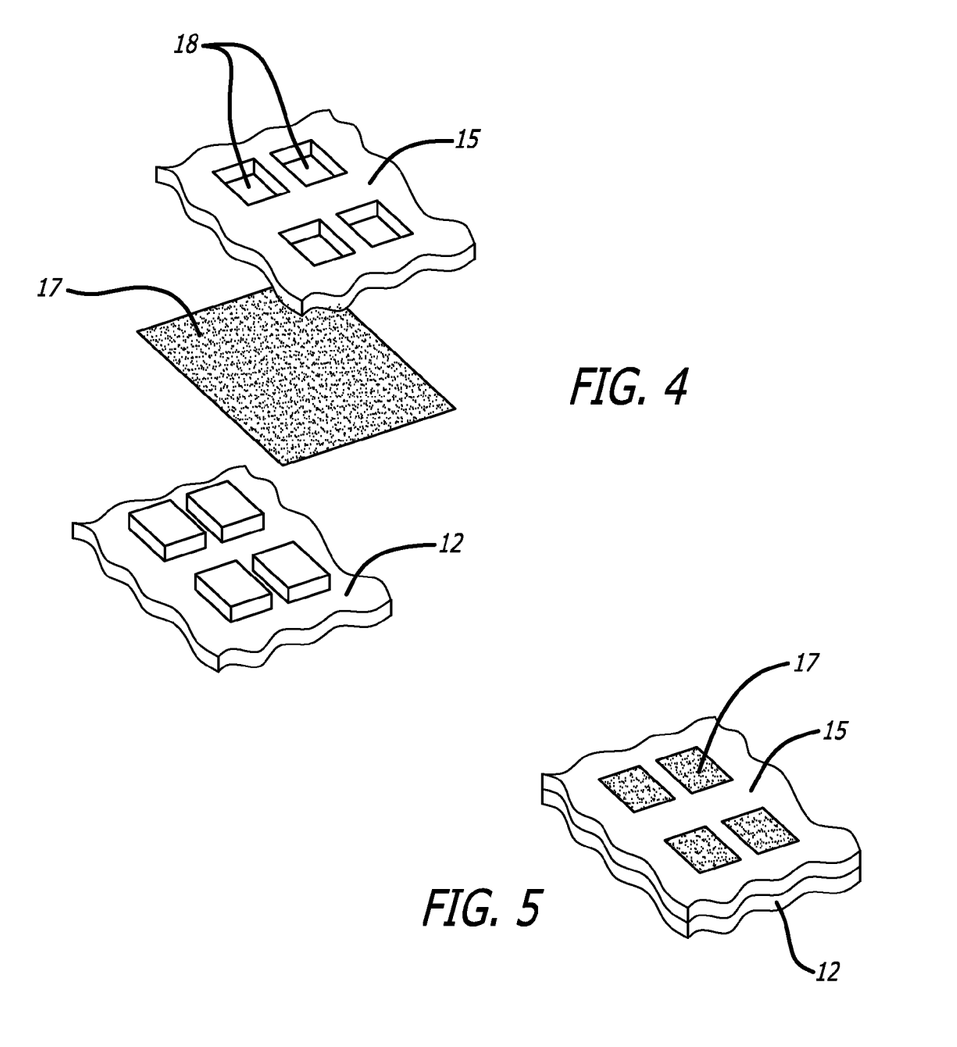
FIG. 4 is an exploded view of a portion of a composite sheet material according to a representative embodiment of the present invention.
FIG. 5 is a perspective view of a portion of a composite sheet material with the patterning template still attached or with a different replacement piece bonded into the indentations formed by the patterning template.

In certain embodiments, the patterning template (e.g., insert 15) has a lattice or grid-like structure, with a two-dimensional array of regularly spaced openings 18 (e.g., illustrated in FIG. 4). However, the patterning template instead may have any other arbitrary shape, provided that it includes a plurality of openings. Preferably, the patterning template is not more than a few centimeters (cm) thick and, more preferably, not more than approximately 1 cm thick. Alternatively, and particularly in embodiments in which patterning insert 15 is made from recycled materials, patterning insert 15 may be thicker, depending the desired quantity of recycled materials that is desired to be incorporated into the resulting composite sheet material.

Also, in the preferred embodiments in which a patterning material 17 is used, the openings (e.g., openings 18) in the patterning template 15 make up at least 50% of the total surface area of the patterning template and, more preferably, from 50-85% of the total surface area, and extend all the way through patterning template 15. In the preferred embodiments, the patterning template is made of a strong and durable material, such as a recycled natural or synthetic rubber, new natural or synthetic rubber, new or recycled plastic, any other new or recycled polymer, or any other recycled material.

It is noted that one aspect of the present invention is the manufacturing of composite sheet materials in which at least one of the materials used is a natural and/or recycled material. The use of such materials often can significantly reduce the environmental impact of a manufacturing process while, at the same time, sometimes providing certain tax and/or import duty benefits. By creating a composite sheet material, as opposed to one that is made solely from natural and/or recycled material, it often is possible to overcome certain perceived drawbacks of such materials. For example, when the resulting composite sheet material is used as a shoe outsole, the potential slipping tendencies of certain natural materials often are mitigated. In addition, it often is the case that recycled natural or synthetic rubber, particularly where only minimal recycling processing has been performed (which generally is preferable in order to minimize environmental impact), will have a non-uniform or rough appearance that consumers will consider cheap or unsatisfactory. On the other hand, by creating a composite sheet material in which the recycled material forms only a portion of the surface, the use of the recycled material actually can contribute to an overall aesthetic design, e.g., an urban look.

In the preferred embodiments of the invention, the sheet of patterning material 17 is a non-woven natural fabric material, e.g., made from fibers of cotton, wool, hemp or any other plant or other natural material. However, in alternate embodiments patterning material 17 is neither natural nor fabric; i.e., any other type of patterning material 17 instead may be used. However, the patterning material 17 preferably is thin (e.g., less than 3 millimeters thick), natural and pliable enough to be pushed down into the openings in the patterning template.

Figure 2A:
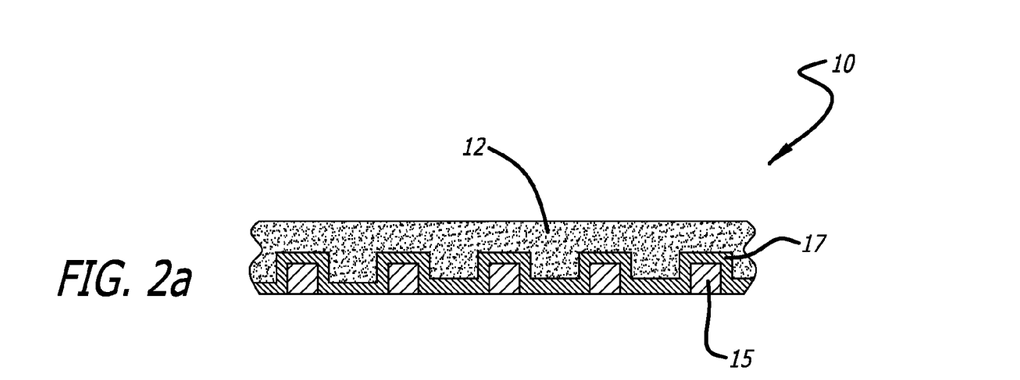
FIG. 2a is a side cross-sectional view of a portion of a composite sheet material with the patterning template embedded according to a representative embodiment of the present invention.

Initially, in the embodiment illustrated in FIG. 1, the patterning material 17 is spread out over the patterning template 15. In addition, in certain embodiments, the patterning material 17 is glued or otherwise adhered to the patterning template 15. The combination of patterning material 17 and patterning template 15 then is fed through an extrusion device 30, which preferably includes a dispenser 32 for dispensing the base or extrusion material 12 (which may be recycled material) and rollers 34 for pressing and shaping the combination of base material 12, patterning template 15 and patterning material 17 into a continuous sheet. As shown in FIG. 1, the base material 12 is deposited on top of the layer of patterning material 17, which in turn is disposed on top of patterning template 15. As a result of this process, the patterning material 17 is forced down into the openings 18 within the patterning template 15 by the base material 12 and the pressure of extrusion device 30, typically all the way down to the bottom of the patterning template 15, so that the patterning material 17 is approximately coplanar with the bottom side of patterning template 15, but with alternating areas of the patterning template 15 and patterning material 17, e.g., as shown in FIGS. 2a and 5 (with an exploded view shown in FIG. 4). Such a coplanar surface generally can be achieved by simply providing a flat surface underneath the patterning template 15 which prevents the patterning material 17 from being pushed down beneath the bottom surface of patterning template 15.

In the present embodiment, the patterning template 15 is intended to be permanently embedded into the resulting composite sheet material 10. Accordingly, patterning template 15 preferably is made, e.g., from ethylene vinyl acetate (EVA), polyvinyl chloride (PVC), thermoplastic rubber (TPR), any other plastic or polymer, and/or any other natural or synthetic leather or rubber (e.g., any recycled material). As illustrated in FIG. 1, the patterning template 15 may be fed from a roll into the extrusion device 30. In fact, patterning template 15 might itself have been previously fabricated using an earlier extrusion process. As also illustrated in FIG. 1, the patterning sheet material 17 also may be fed from a roll so that the present extrusion process can be performed on a continuous basis. In any event, because the patterning template 15 remains embedded within the composite sheet material, the very bottom of the composite sheet material preferably has alternating areas of the patterning material 17 and the patterning template 15, e.g., as illustrated in FIGS. 2a and 5 (with an exploded view shown in FIG. 4).

It is noted that in the embodiment discussed above, the patterning template 15 and patterning material 17 are fed from large rolls of such materials. Alternatively, either or both of such materials may be provided as smaller flat pieces so that are fed into extrusion device 30 to create the desired pattern and lamination.

Figure 2B:
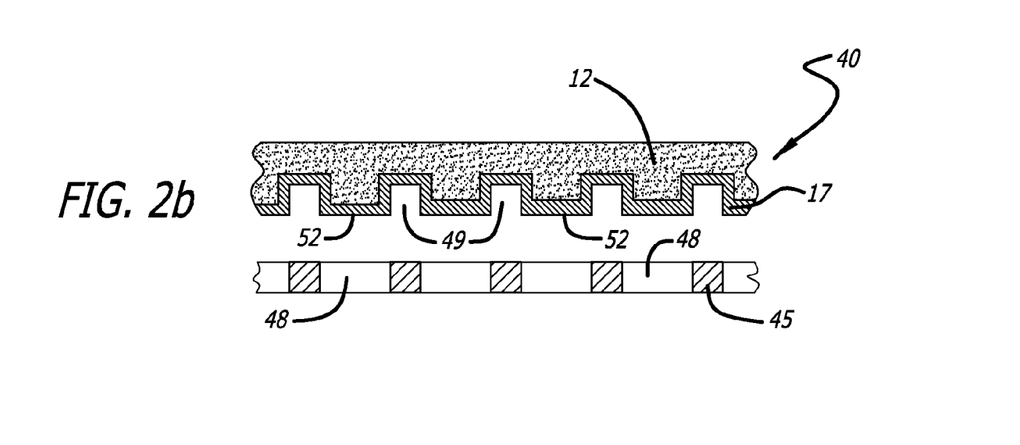
FIG. 2b is a cross-sectional side view of a portion of a composite sheet material with the patterning template removed according to an alternate representative embodiment of the present invention.
Figure 3:
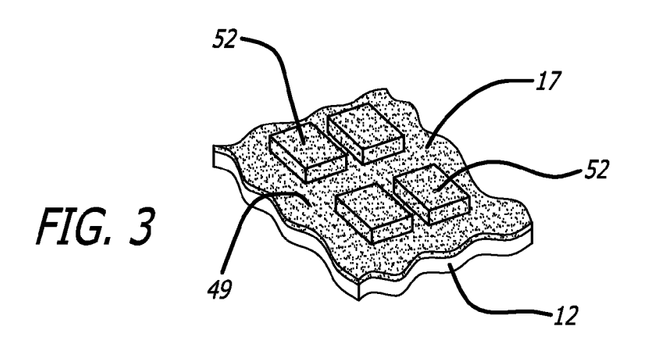
FIG. 3 is a perspective view of a portion of a composite sheet material with the patterning template removed according to a representative embodiment of the present invention.

In a second representative embodiment, e.g., as illustrated in FIGS. 2b and 3, the patterning template 45 that is used is intended to be temporary, i.e., removed from the resulting composite sheet material 40. Similar to the previous embodiment, the patterning template 45 in the present embodiment preferably includes a number of openings 48. In fact, the sizes and patterns of the openings 48 may be the same as those described above for openings 18 in patterning template 15. However, because patterning template 45 is intended to be removed, the openings 48 need not extend all the way through patterning template 45.

In the present embodiments, the patterning template 45 may be made, e.g., from steel or any other strong material. After removal of the patterning template 45 in this embodiment, indentations 49 are formed in composite sheet material 40, corresponding to the structure of patterning template 45. Those indentations 49 contrast with the protruding portions 52 where the base material 12 (which again may be a recycled material) and patterning material 17 were pressed into the patterning template openings 48 during the extrusion process. After the patterning template 45 is removed, those indentations 49 may be filled with another material, e.g., by gluing or otherwise adhering EVA, PVC, TPR, any other plastic or polymer, and/or any other natural or synthetic leather or rubber (e.g., any recycled material) into the indentations, preferably such that the bonded material extends to the same level as the protrusions 52. For example, where the patterning template 45 has a grid-like shape, a single similarly shaped sheet (sometimes generically referred to herein as a replacement piece) may be bonded into the resulting indentations 49, resulting in the appearance illustrated in FIG. 5, but with patterning template 15 replaced by the replacement piece that has been bonded into the indentations 49.

As a result, a similar effect is achieved as in the previous embodiment, albeit with an additional bonding step. Alternatively, multiple different replacement pieces (e.g., of the same or different types of material) may be bonded into different indentations 49, e.g., to create any desired aesthetic and/or functional effect. In certain embodiments, the replacement piece (which term is intended to include multiple replacement pieces unless expressly stated otherwise) is made of a recycled material, e.g., as described above.

Figure 6A:
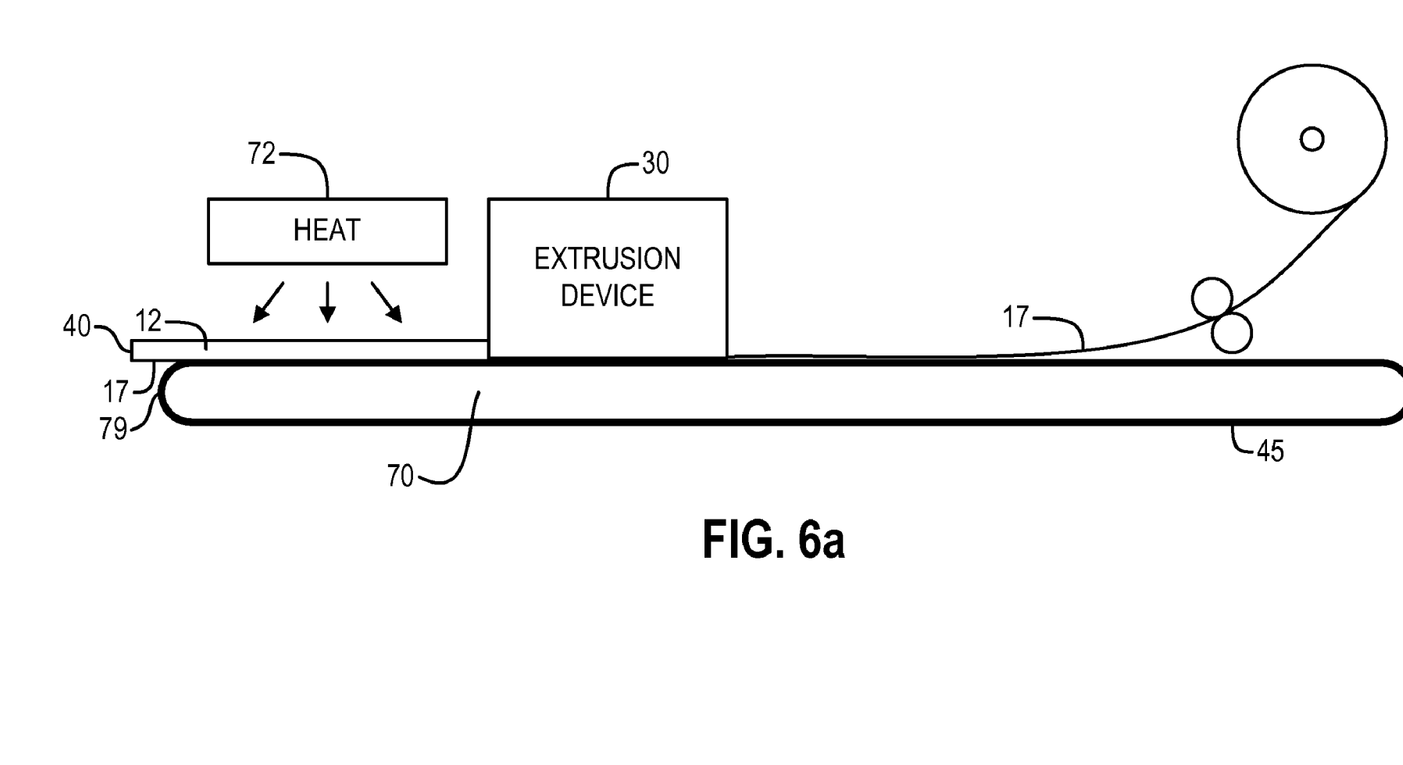
FIG. 6a is a conceptual side view of an extrusion system in which the patterning template is provided on the surface of a conveyor belt and is removed from the resulting sheet material.

An apparatus for implementing the process of this second embodiment is illustrated in FIG. 6a. Here, the surface 45 of the conveyor belt 70 itself is used as the patterning template. That is, the surface of conveyor belt 70 has the desired (e.g., lattice or grid-like) pattern. In order to allow the patterning surface 45 to bend, individual squares, rectangles or other desired patterning components forming its structure preferably are pinned or hinged to each other.

Figure 6B:
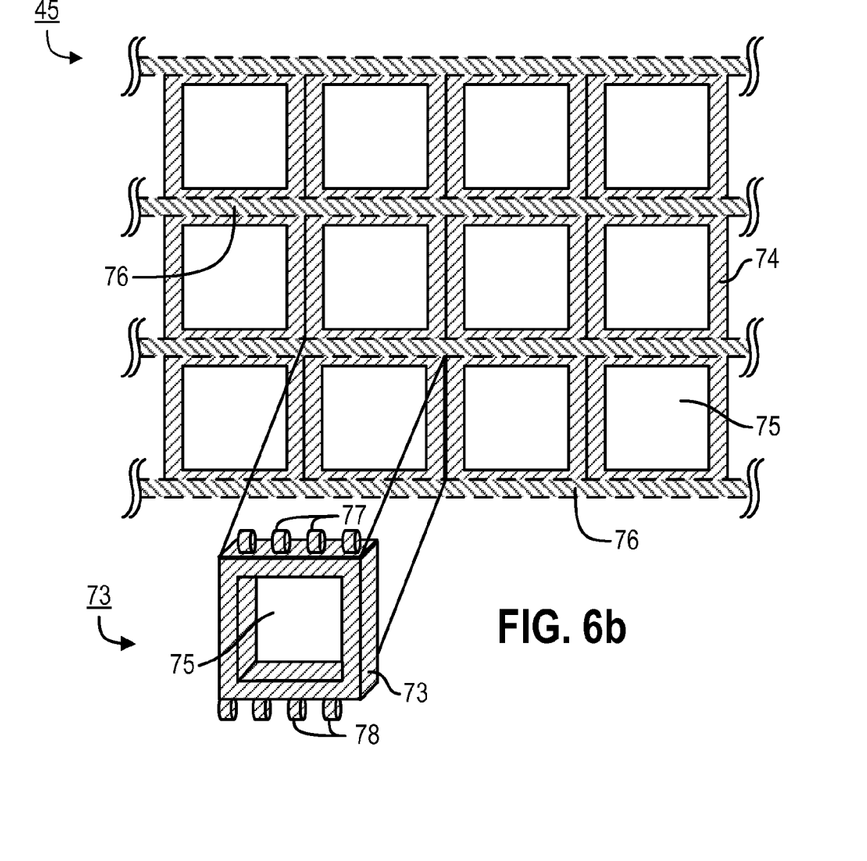
FIG. 6b is a top plan view of the conveyor belt surface, functioning as a patterning surface within this embodiment, together with an exploded perspective view of one component cell of such surface.
Figure 6C:
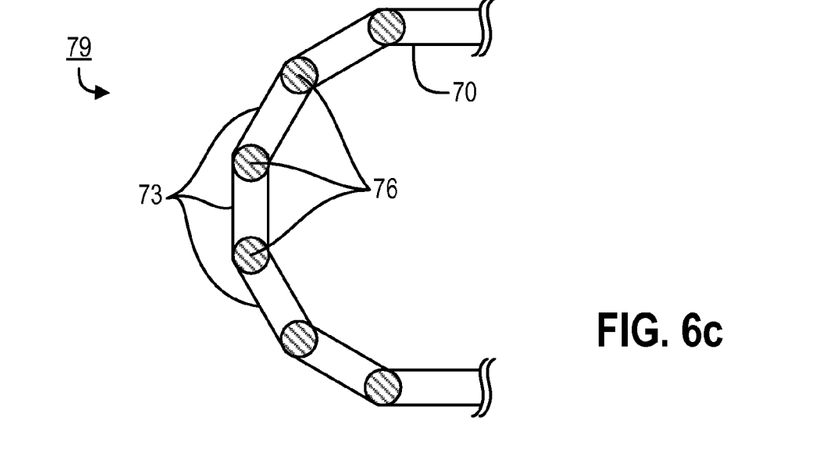
FIG. 6c is a side elevational view of the end of the conveyor belt, all in accordance with a representative embodiment of the present invention.

One example of such a surface 45 is illustrated in FIG. 6b. In this example, the surface 45 includes a number of component cells 73, each having a square or rectangular border 74 that encloses a square or rectangular opening 75. In the present embodiment, the left and right sides of the borders 74 for adjacent component cells 73 are rigidly attached to each other, while the bottom edge of each row of component cells 73 is attached to the top edge of the row immediately beneath it using an extended pin 76, so that the two rows essentially are hinged to each other, i.e., permitting the overall surface 45 to flex within a vertical plane. As shown in the exploded view, each single component cell 73 in this embodiment includes a row of rings 77 along its top edge and a row of rings 78 along its bottom edge, with rings 78 being offset relative to rings 77. Because the rings are offset, row 78 for one component cell 73 meshes with row 77 for the component cell 73 that is immediately beneath it; inserting pin 76 through the mashed rings of 77 and 78 results in the desired hinging effect. As a result of this construction, the conveyor belt surface 45, in addition to functioning as a patterning surface, is able to flex around the end 79 of the conveyor belt 70, e.g., as shown in FIG. 6c.

In the present embodiment, the patterning sheet material 17 is simply laid across the patterning surface 45 and then fed through the extrusion device 30. At the immediate output of extrusion device 30, the composite material 40 has the patterning sheet material 17 (on its bottom surface) pressed into the base material 12 (on its top surface), with the patterning surface 45 of the conveyor belt 70 embedded into the composite material 40. After a partial or complete curing operation (e.g., resulting from heat source 72), the conveyor belt 70 ends at position 78, rolling away from, and thereby separating from, the composite sheet material 40, which then preferably continues onto a different conveyor belt or is rolled up for later use.

In a third representative embodiment, the technique of the first embodiment discussed above is used, except that no patterning sheet material 17 is used. In this case, the patterning template 15 (which preferably remains as part of the final composite sheet material) preferably itself is formed of a natural but fairly substantial and/or non-permeable material, such as reconstituted leather (e.g., formed by pressing scrap leather particles together). More preferably, the surface area occupied by the patterning template 15 in this embodiment is at least 50% of the total surface area and, more preferably, from 50-85%. Accordingly, the bottom surface of the composite sheet material has alternating areas of the base material 12 and the patterning template 15. Alternatively, either the patterning template 15 or the base material 12 (although preferably not both) is formed of a recycled material; as a result, the composite sheet material has different areas of new and recycled material, with the particular pattern having been defined by the configuration of the patterning template 15 and the specific materials used for each component.

In a fourth representative embodiment, the technique of the second embodiment discussed above is used, except that no patterning sheet material 17 is used. In this case, the sheet of material that comes out of the extrusion device 30 is formed entirely of the base material 12. The replacement piece bonded into the indentations following removal of the patterning template (such bonding resulting in the final composite sheet material) preferably is formed of a natural but fairly substantial and/or non-permeable material, such as reconstituted leather (e.g., formed by pressing scrap leather particles together). Preferably, the surface area occupied by the bonded material in this embodiment is at least 50% of the total surface area and, more preferably, from 50-85%. Accordingly, the bottom surface of the composite sheet material has alternating areas of the base material and the bonded material. Alternatively, either the replacement piece or the base material 12 (although preferably not both) is formed of a recycled material; as a result, the composite sheet material has different areas of new and recycled material, with the particular pattern having been defined by the configuration of the patterning template 15, the configuration of the replacement piece and the specific materials used for each component.

Figure 7:
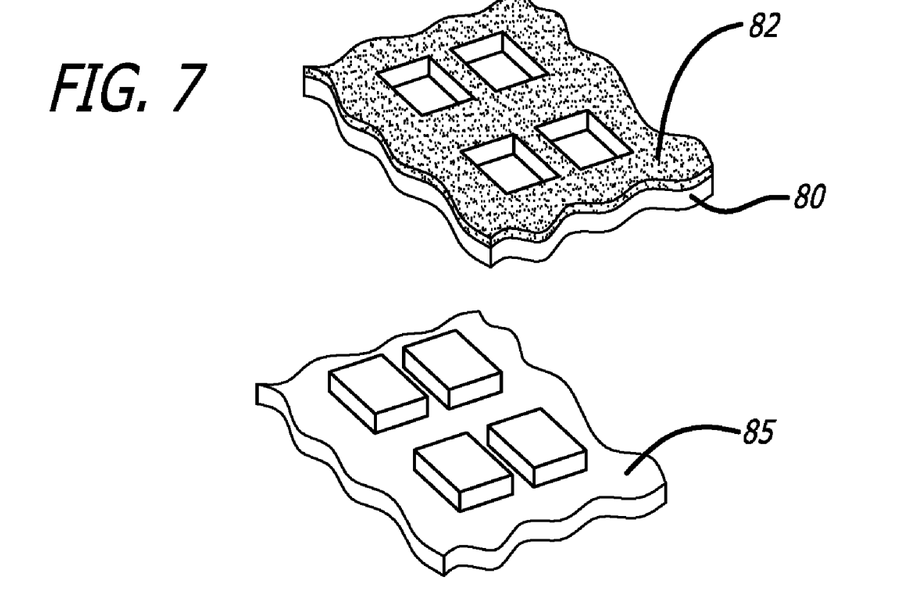
FIG. 7 illustrates an exploded view of a portion of a composite sheet material according to a representative embodiment of the present invention.
Figure 8:
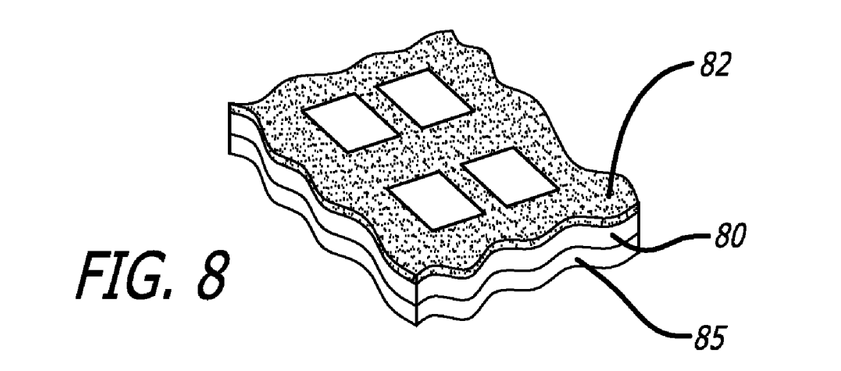
FIG. 8 shows a portion of the fully assembled composite sheet material illustrated in FIG. 7.

In a fifth representative embodiment, illustrated in FIGS. 7 and 8, a flat backing sheet 80 has an attached second sheet material 82. In the preferred implementations of this embodiment of the invention, sheet 80 is a strong and durable and/or spongy material, such as EVA, PVC, TPR, any other plastic or polymer, and/or any other natural or synthetic leather or rubber (e.g., in a recycled material). Preferably, the main purpose of backing sheet 80 is to provide some measure of thickness where the second sheet material 82 is relatively thin, such as where second sheet material 82 is a sheet of fabric. In this regard, second sheet material 82 preferably is a natural material, such as a natural fabric, leather (e.g., reconstituted leather) or plant material.

It is noted that second sheet material 82 may be attached to flat backing sheet 80 using a process in which the two are extruded together, as described above, but without the use of a patterning template. Alternatively, second sheet material 82 may be simply glued or otherwise bonded or laminated onto backing sheet 80 after each has been separately manufactured (e.g., by separately extruding backing sheet 80). In one sub-embodiment, both backing sheet 80 and second sheet material 82 have matching holes and are attached to each other such that the holes match up. In another sub-embodiment, both backing sheet 80 and sheet material 82 are largely continuous, and the holes are cut out after the two have been attached to each other.

In either event, a base material sheet 85 having a plurality of protrusions that match up with the holes preferably is bonded to the combination of backing sheet 80 and sheet material 82, such that the protrusions in base material sheet 85 extend through such holes. More preferably, when bonded in this manner such extrusions extend to the same level as the surface of second sheet material 82, as illustrated in FIG. 8, so that there are alternating areas of different material that are approximately coplanar with each other. In certain embodiments, base material sheet 85 is formed of a recycled material, either in addition to or instead of backing sheet 80.

A sixth representative embodiment is identical to the fifth representative embodiment discussed above, except that rather than using a separate backing sheet 80 and second sheet material 82, a single sheet having similar holes is used. In this embodiment, that single sheet preferably is made of a natural material having a fair degree of thickness (e.g., approximately 1-3 cm), such as reconstituted leather. A sheet of base material 85 having matching protrusions preferably is bonded to such a single sheet in the same manner as bonded to the combination of backing sheet 80 and sheet material 82 in the fifth embodiment discussed above. Alternatively, either such single sheet or the sheet of base material 85 (although preferably not both) is formed of a recycled material; as a result, the composite sheet material has different areas of new and recycled material, with the particular pattern having been defined by the configurations of and the specific materials used for each component.

In any of the foregoing embodiments, the resulting composite sheet material can be cut into any desired shape. In one preferred embodiment, the composite sheet material manufactured in accordance with the present invention is cut into and used for shoe outsoles, where the bottom surface of the shoe outsole has alternating areas of different types of materials, with the natural materials preferably constituting at least 50% of the total surface area and, more preferably, from 50-85%, and/or where the bottom surface area has alternating areas of recycled and new materials.

Figure 9:
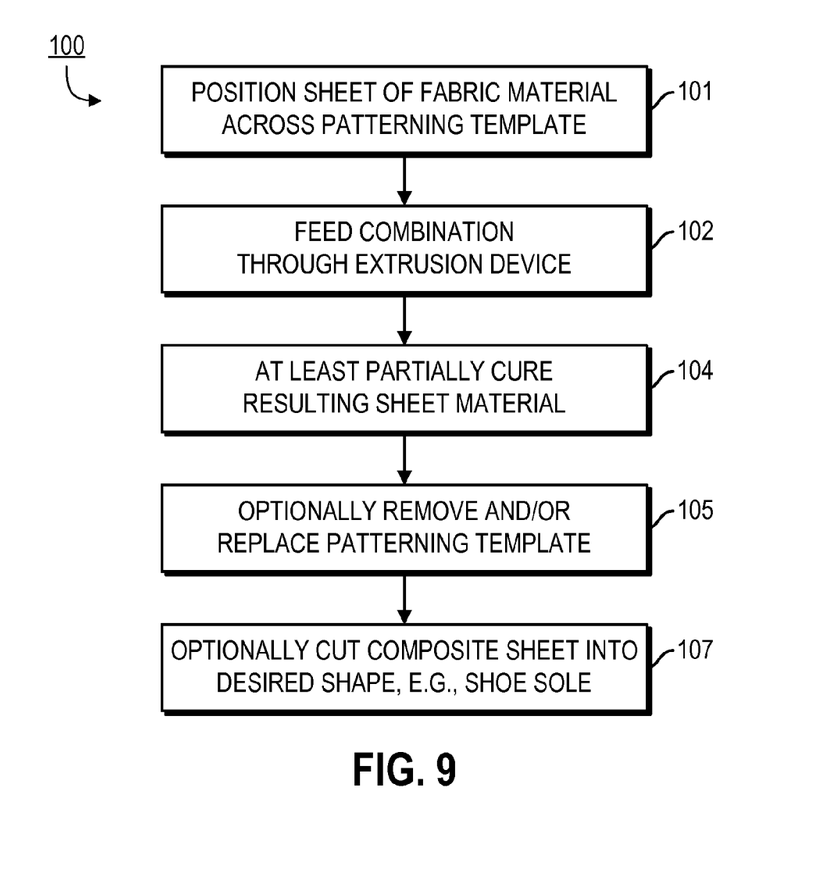
FIG. 9 is a flow diagram illustrating a process for manufacturing a composite sheet according to a first representative embodiment of the present invention.

A process 100 for manufacturing a composite material according to a first representative embodiment of the present invention is now summarized with reference to FIG. 9. Initially, in step 101 a sheet of fabric material (e.g., sheet 17) is positioned across a patterning template (e.g., template 17 or 45) having a plurality of openings. Next, in step 102 the combination of the sheet of fabric material and patterning template is fed through an extrusion device (e.g., device 30); preferably, extrusion material 12 coats the fabric material 17 and forces the fabric material 17 into the openings in the patterning template, thereby producing a composite sheet material. In step 104, the resulting composite sheet material is at least partially cured. In step 105, the patterning template optionally is removed and/or replaced, e.g., by bonding a different piece of material into recesses left behind upon removing the patterning template. Finally, in step 107 the composite sheet optionally is cut into a desired shape and used (e.g., as a shoe outsole by bonding or molding the cut piece with other components of a shoe). In certain embodiments, at least one of the extrusion material 12 or the patterning template 15 is made of a recycled material. It is noted that the extrusion material 12 typically will not be visible on the surface of the resulting composite sheet material in this embodiment and, therefore, generally can be made of recycled material.

Figure 10:
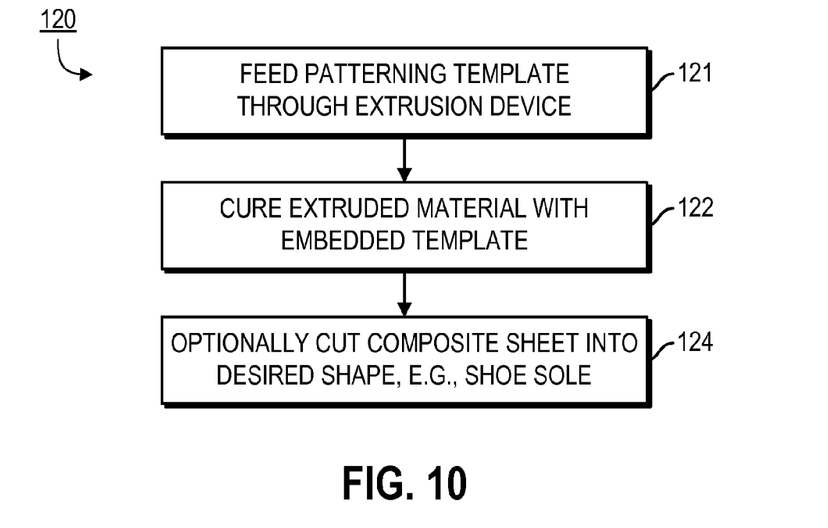
FIG. 10 is a flow diagram illustrating a process for manufacturing a composite sheet according to a second representative embodiment of the present invention.

A process 120 for manufacturing a composite material according to a second representative embodiment of the present invention is now summarized with reference to FIG. 10. Initially, in step 121 a patterning template (e.g., patterning template 15) is fed through an extrusion device (e.g., device 30). Next, in step 122 the extruded material 12 with the patterning template embedded is caused or allowed to cure, thereby producing a composite sheet material, e.g., one that includes a surface having alternating areas of the extrusion material and the patterning template. Finally, in step 107 the composite sheet optionally is cut into a desired shape and used (e.g., as a shoe outsole by bonding or molding the cut piece with other components of a shoe). Preferably, the extrusion material and the patterning template are made of different materials (which can include embodiments in which both are made of the same general type of material, with one being new and the other being recycled material). More preferably: (1) the patterning template is formed from a natural material, (2) the patterning template is made from a recycled material, and/or (3) the extrusion material is made from a recycled material.

Figure 11:
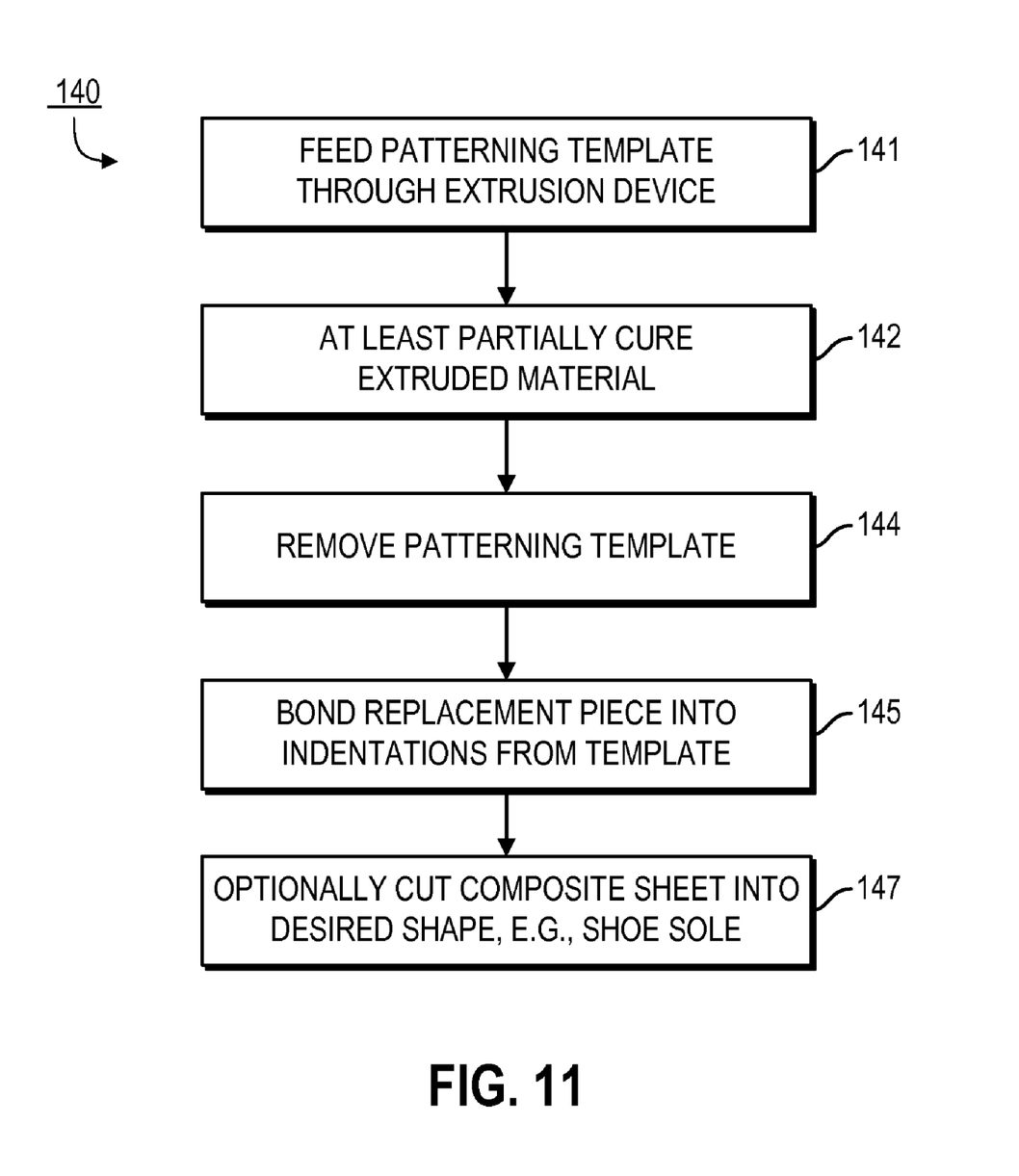
FIG. 11 is a flow diagram illustrating a process for manufacturing a composite sheet according to a third representative embodiment of the present invention.

A process 140 for manufacturing a composite material according to a third representative embodiment of the present invention is now summarized with reference to FIG. 11. Initially, in step 141 a patterning template (e.g., template 45) is fed through an extrusion device (e.g., device 30). Next, in step 142 the extruded material 12 is caused or allowed to cure, and in step 144 the patterning template is removed. In step 145, a replacement piece (e.g., made of natural or recycled material) is bonded into indentations in the extrusion material 12 produced by the patterning template, thereby producing a composite sheet material. Finally, in step 147 the composite sheet optionally is cut into a desired shape and used (e.g., as a shoe outsole by bonding or molding the cut piece with other components of a shoe). Preferably, the extrusion material and the replacement piece are made of different materials (which can include embodiments in which both are made of the same general type of material, with one being new and the other being recycled material). More preferably: (1) the replacement piece is formed from a natural material, (2) the replacement piece is made from a recycled material, and (3) the replacement piece is made from a recycled material is.

Additional Considerations.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of manufacturing sheet material, comprising:
    positioning a sheet of fabric material across a patterning template, said patterning template having a plurality of openings; and
    feeding the sheet of fabric material and the patterning template through an extrusion device in which extrusion material coats the fabric material and forces the fabric material into the openings in the patterning template, thereby producing a composite sheet material.

2. A method according to claim 1, wherein the sheet of fabric material is continuously fed from a roll of fabric material.

3. A method according to claim 1, wherein the patterning template is continuously fed from a roll of template material.

4. A method according to claim 1, wherein the patterning template remains permanently embedded in the composite sheet material.

5. A method according to claim 1, further comprising a step of removing the patterning template from the composite sheet material after the extrusion material has at least partially cured.

6. A method according to claim 5, further comprising a step of bonding a material into recesses left behind upon removing the patterning template.

7. A method according to claim 5, wherein the patterning template is a surface of a conveyor belt.

8. A method according to claim 1, wherein the sheet of fabric material comprises a natural fabric.

9. A method according to claim 1, wherein the sheet of fabric material is a non-woven natural fabric material.

10. A method according to claim 1, wherein the patterning template has a lattice structure.

11. A method according to claim 1, wherein the patterning template is not more than 1 centimeter thick.

12. A method according to claim 1, further comprising a step of cutting a piece of the composite sheet material and using the piece as at least a portion of a shoe outsole.

* * * * *